United States Patent [19]

Felsenstein

[11] Patent Number: 5,012,231
[45] Date of Patent: Apr. 30, 1991

[54] METHOD AND APPARAUS FOR CURSOR MOTION HAVING VARIABLE RESPONSE

[75] Inventor: Lee Felsenstein, Berkeley, Calif.

[73] Assignee: Golemics, Inc., Berkeley, Calif.

[21] Appl. No.: 287,102

[22] Filed: Dec. 20, 1988

[51] Int. Cl.$^5$ ............................................... G09G 5/08
[52] U.S. Cl. .................................... 340/709; 340/706
[58] Field of Search ............... 340/706, 709, 710, 711; 273/148 B

[56] References Cited

U.S. PATENT DOCUMENTS

| | | | |
|---|---|---|---|
| 3,541,521 | 11/1970 | Koster . | |
| 3,863,098 | 1/1975 | Mehr | 315/367 |
| 4,313,113 | 1/1982 | Thornburg | 340/709 |
| 4,386,346 | 5/1983 | Levine | 340/709 |
| 4,552,360 | 11/1985 | Bromley et al. | 273/148 B |
| 4,563,740 | 1/1986 | Blake et al. . | |
| 4,580,006 | 4/1986 | Hull | 178/18 |
| 4,624,537 | 11/1986 | Hanssen et al. | 350/531 |
| 4,673,919 | 6/1987 | Kataoka | 340/709 |
| 4,680,577 | 7/1987 | Straayer et al. | 340/711 |
| 4,698,626 | 10/1987 | Sato et al. | 340/709 |
| 4,734,685 | 3/1988 | Watanabe | 340/710 |
| 4,746,913 | 5/1988 | Volto | 340/706 |

FOREIGN PATENT DOCUMENTS

| | | | |
|---|---|---|---|
| 0195939 | 11/1983 | Japan | 340/709 |
| 0009746 | 1/1984 | Japan | 340/709 |
| 0206933 | 11/1984 | Japan | 340/709 |

Primary Examiner—Jeffery A. Brier

[57] ABSTRACT

A method and apparatus for controlling the movement of cursor indicia on display screens is disclosed in which the parameters of the equations of motion used to translate signals originating from positioning actuators into movement of the cursor may be varied. Factors such as the rate of change of the actuation signal, position of the cursor on the display screen, voluntary control input from the operator, and conditions determined by application software may be used to vary these parameters.

8 Claims, 6 Drawing Sheets

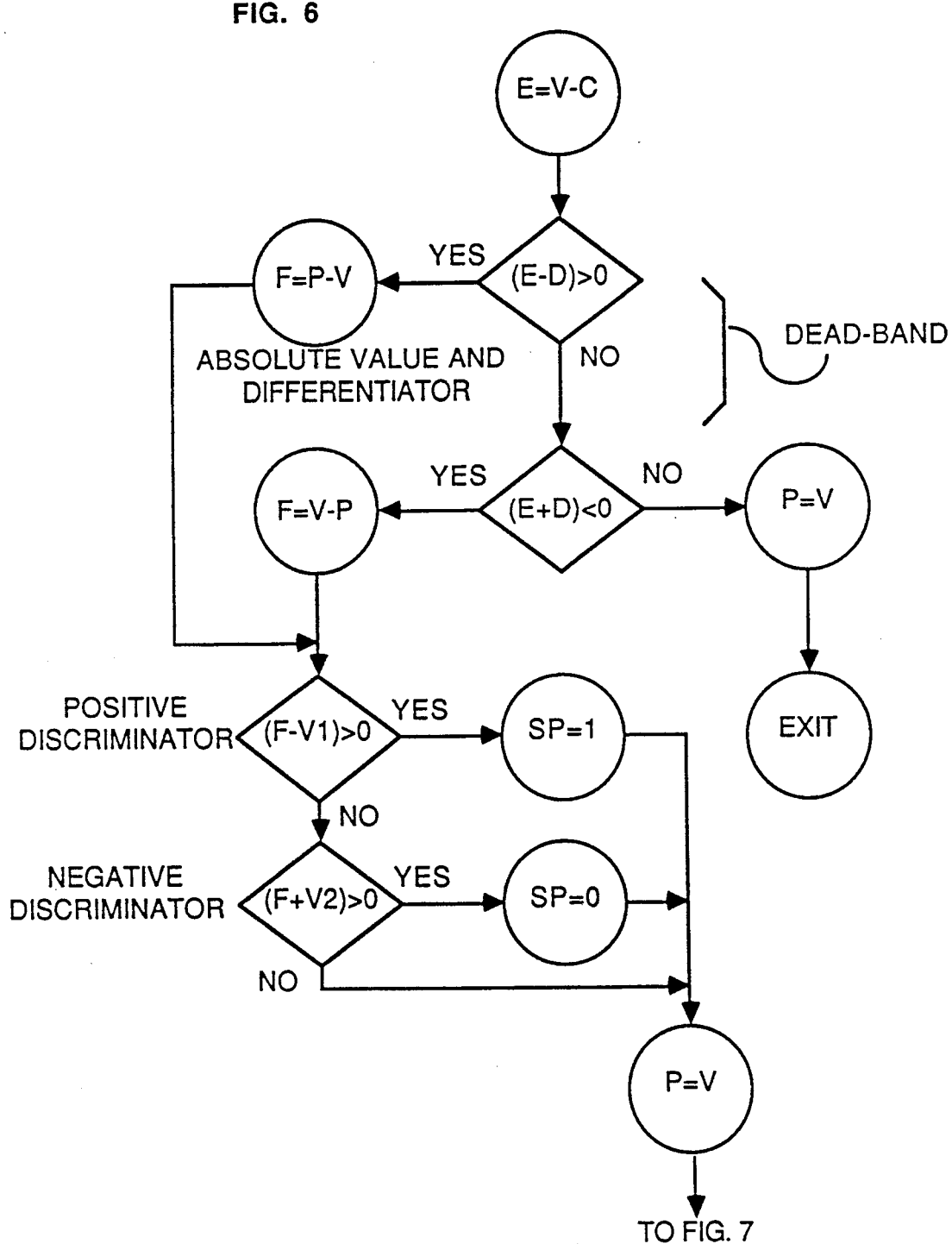

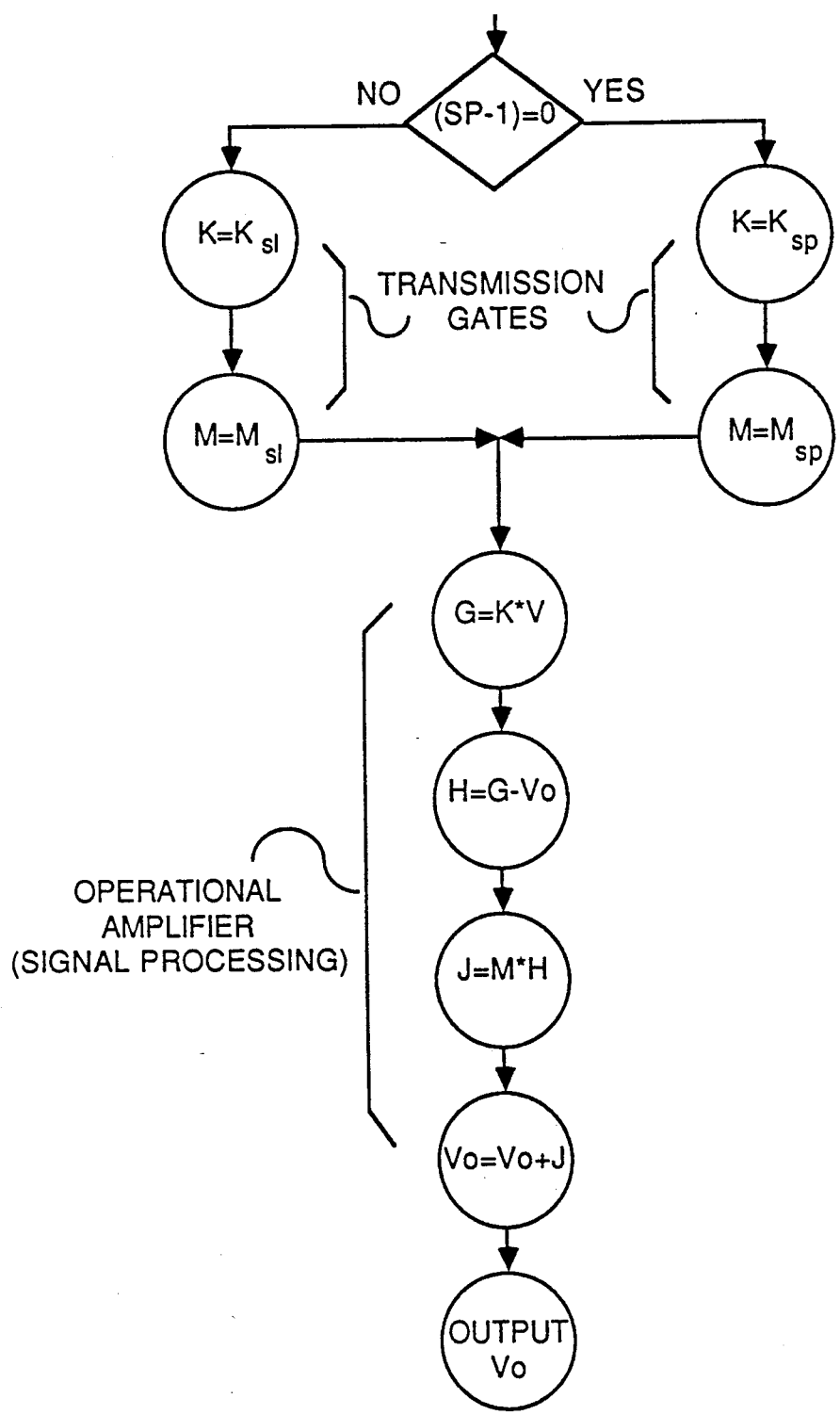

METHOD AND APPARAUS FOR CURSOR MOTION HAVING VARIABLE RESPONSE

BACKGROUND

1. Field of Invention

This invention relates to computers having graphic display screens, specifically to the mechanism for controlling the motion of a graphic cursor.

BACKGROUND

2. Description of Prior Art

Heretofore, in computer systems utilizing a graphic display screen, the methods and apparatus through which the user expresses control over the speed and direction of motion of a cursor on the computer display screen have been relatively unsophisticated. This has resulted in a marketplace resistance to the use of several different forms of cursor-positioning actuators with such graphically-oriented computers and has created a serious obstacle to the practicality of using such computers in a portable or "laptop" environment.

These methods and apparatus are embodied in a combination of hardware actuators and software to interpret the signals received from the actuators. The most prevalent actuating device in use is the "mouse", which is hand-held and which rolls freely on a two-dimensional working surface. Other devices in common use include the trackball, a spherical actuator which is spun in two dimensions by the use's hand, and the joystick, a vertical actuator which is displaced within a range of movement in two dimensions by the user's hand. A variation of the joystick is the isometric or force joystick, which does not move perceptibly but rather responds to the two-dimensional vector of force exerted by the user's hand.

All such devices produce one or more electrical signals in response either to movement or force. These signals must be further processed so as to result in movement of the cursor indicia on the computer's display screen. The rules by which this processing occurs determine the dynamic response of the system for cursor control and are perceived by the operator as a kinaesthetic effect. The subjective response of the operator to this effect must be taken into account in the design of such systems for cursor control. In effect, the operator must feel as if the cursor control system is a natural extension of his or her body, responding accordingly to his or her intentions.

The isometric joystick presents a particular problem in this regard, since the actuator device offers no kinaesthetic feedback to the operator. Despite the fact that the isometric joystick is the actuator most conservative of space and best suited to integration in a keyboard structure, as described in U.S. Pat. No. 4,680,577, its use is almost unknown in the commercial computer marketplace where immediate usability by untrained operators is a requirement.

Various attempts have been made to improve the kinaesthetic response of the isometric joystick. U.S. Pat. No. 3,541,521 to Koster (1970) discloses a nonlinear mapping of actuator output to cursor motion depending upon the rate of change of the actuator output. This permits finer control by the operator for small movements while permitting rapid movement for covering long distances. U.S. Pat. No. 4,624,537 to Hanssen et al. (1986) discloses a somewhat more sophisticated mechanism to implement nonlinear mapping, involving the mean value of the x and y channel signals. U.S. Pat. No. 4,580,006 to Hull (1986) discloses a method in which a threshold actuator velocity is established such that position-to-position mapping is expressed above the threshold and velocity-to-velocity mapping is established below the threshold. U.S. Pat. No. 4,563,740 to Blake et al. (1986) discloses a stepwise nonlinear velocity-to-velocity mapping of a trackball actuator.

All such signal processing methods display a constant response in the time domain in that the response of the system does not change in time when the input from the operator is constant over time. U.S. Pat. No. 3,863,098 to Mehr (1975) discloses a processing method involving a two-slope transfer function for mapping force to cursor velocity, with the cursor behavior at the point of transition smoothed through application of a "quickening" circuit. Such quickening is implemented by a transfer function which applies a factor of $(1-EXP(-Kt))$, where K is a constant, t is time, and $EXP(x)$ represents the base of natural logarithms raised to the x power.

This "quickened" response characteristic is the only disclosed response which is variable in the time domain. The parameter K in the above equation which determines dynamic response of the system disclosed in U.S. Pat. No. 3,541,521 to Koster (1970) is fixed and not under control of the operator in any way. My research into the kinaesthetic aspect of such isometric positioning systems indicates that a greatly improved kinaesthetic response may be obtained if the dynamic response is different for slowing actions than it is for speeding actions. Speeding actions are defined here as actions wherein the first time derivative of the force applied to the joystick is positive, slowing actions have a negative derivative. Also, my research indicates that the speeding and slowing quickening parameters (K in the above equation) as well as the gain must be capable of adjustment by the operator to adapt the system dynamics to the operator's level of familiarity and dexterity.

Objects and Advantages

It is the purpose of this invention to provide an improved method of converting signals received from isometric or limited-movement actuators into cursor motion on the display screen, while allowing for a finer degree of control and adaptability to the operator's kinaesthetic conditioning. One result of this improvement will be the increased utility of limited-movement actuators as part of portable computer systems, where use of the mouse is impractical due to lack of a working surface.

Another benefit will be the improvement in productivity due to the incorporation of the limited-movement actuator in close proximity to the rest position of the operator's fingers on the standard keyboard, thus eliminating the need to move one hand from the keyboard in order to command cursor movements.

A final benefit will be improvement in the operator's subjective response to the use of the system as compared to the response to the use of a less sophisticated method of cursor control, thus resulting in an additional improvement in productivity.

DRAWING FIGURES

Figure 1:
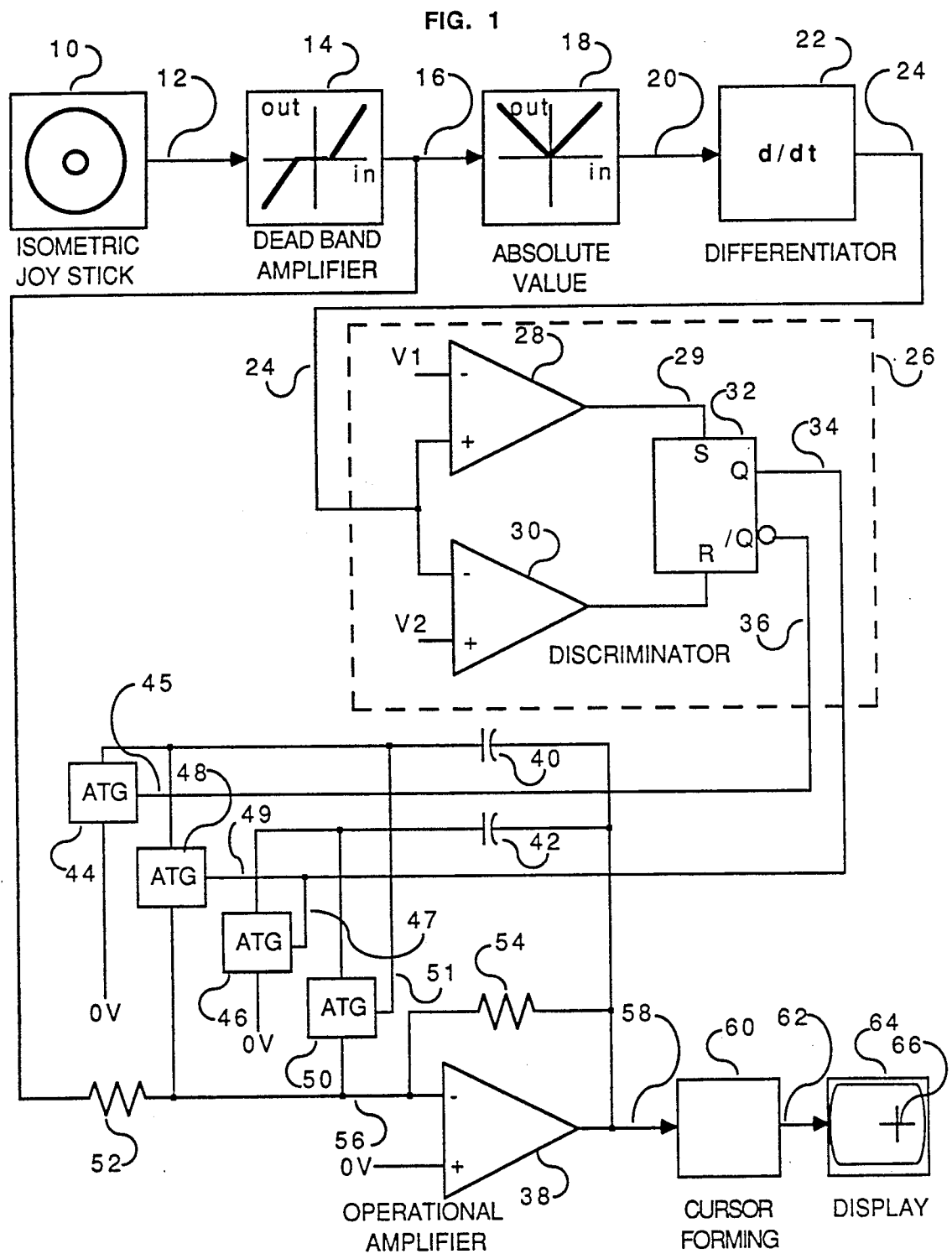
FIG. 1 shows a block diagram of one channel of a signal conditioning circuit which produces cursor motion from an isometric joy stick.
Figure 5:
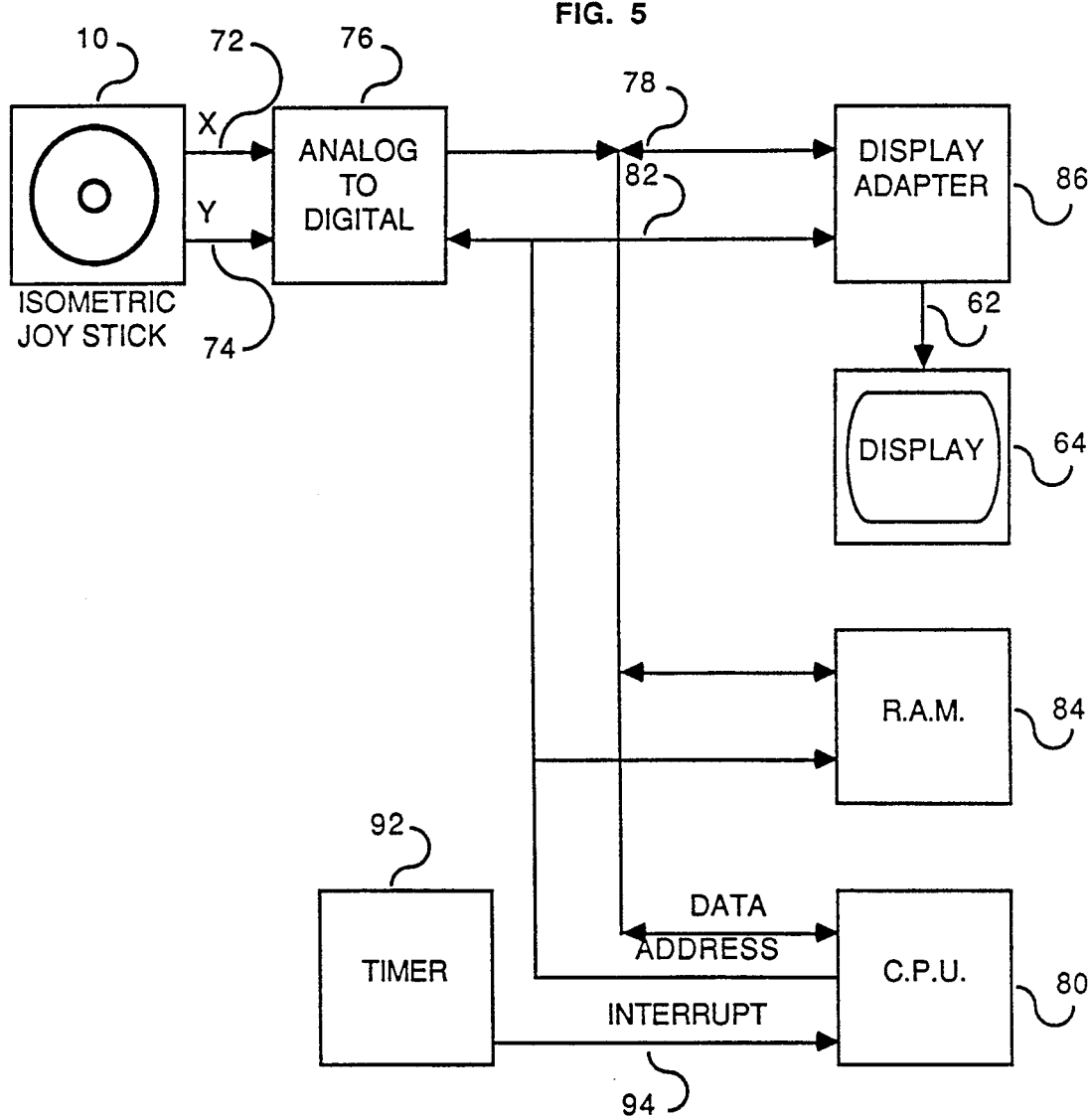
FIG. 5 shows a block diagram of a microprocessor circuit used to implement a software version of the circuit of FIG. 1.

FIGS. 6 and 7 constitute a software flow diagram which implements the circuit of FIG. 1 when used with the circuit of FIG. 5.

LIST OF REFERENCE NUMERALS

10—Isometric joy stick actuator
12—Output of one channel of 10
14—Amplifier with "dead band"
16—Output of 14
18—Absolute value circuit
20—Output of 18
22—Differentiator circuit
24—Output of 22
26—Polarity discriminator with storage
28—Positive level comparator
29—Output of 28
30—Negative level comparator
31—Output of 30
32—Latch
34—"True" output of 32
36—"False" output of 32
38—Operational amplifier
40—"Speeding" capacitor
41—"Speeding" network
42—"Slowing" capacitor
43—"Slowing" network
44—Analog transmission gate-"speeding bypass"
45—Control input of 44
46—Analog transmission gate-"slowing bypass"
47—Control input of 46
48—Analog transmission gate-"speeding connect"
49—Control input of 48
50—Analog transmission gate-"slowing connect"
51—Control input of 50
52—Input resistor
54—Feedback resistor
56—Summing junction
58—Output of operational amplifier
60—Cursor forming circuit
62—Output of 60
64—Display
66—Cursor
72—X output of 10
74—Y output of 10
76—Analog to digital converter
78—Data bus
80—Central Processing Unit
82—Address bus
84—Random access memory
86—Display adapter
92—Interrupt timer
94—Interrupt signal

DESCRIPTION OF INVENTION

In FIG. 1 a signal conditioning circuit processes the output of one channel of an isometric x-y joystick (10). The other channel's signal is processed by an identical circuit.

The output of the joystick (10) is processed by an amplifier (14) having a "dead zone" centered about the zero-input response of the joystick (10). This dead zone is useful to eliminate spurious system response due to noise or incremental offset of the joystick (10).

The output (16) of the amplifier (14) is passed to an absolute value circuit (18) which produces an output (20) which is positive in polarity regardless of the polarity of the input, and is otherwise a linear transform of the input. This output (20) is passed to differentiator circuit (22) whose output (24), representing the time derivative of the input, is passed to a discriminator circuit (26). The discriminator circuit (26) is comprised of two comparators (28) and (30) whose outputs (29) and (31) drive set and reset inputs of latch (32), whose complementary outputs (34) and (36) thereby indicate the last detected polarity of the differentiated signal (24). Output (34) will be active after differentiator (22) yields a positive polarity, indicating an increasing signal (16) of either polarity. Likewise, output (36) will be active after the polarity of the differentiated signal is detected as negative, indicating a decreasing signal (16) of either polarity.

Output (16) of amplifier (14) is also passed to an operational amplifier (38) having an input resistor (52) and a feedback resistor (54) connected so as to establish an inverting amplifier having a fixed gain set by the ratio of the resistors (52) and (54). The output (58) of the operational amplifier (38) is connected to a cursor generation circuit (60) whose output (62) is passed to a display device, typically a cathode-ray tube (64).

The cursor generation circuit (60) causes the presentation of a cursor (66) on the screen of the display device (64) which moves at a velocity determined by the value of the output (58) of the operational amplifier (38) in the respective dimension corresponding to the channel of the joystick (10) which is the source of the control signal (12). For a two-dimensional display system the entire circuit will be implemented twice, once for the x dimension of the joystick (10) and again for the y dimension.

The operational amplifier (38) has two capacitors (40) and (42) connected from the output (58) to the summing junction (56) by means of analog transmission gates (48) and (50), similar to sections of a CMOS integrated circuit type 4066B manufactured by RCA and other companies. Such analog transmission gates serve to conduct current in either direction between their inputs and outputs when their control inputs (47) and (49) are active, and to present a high impedance between their inputs and outputs when their control inputs are inactive. Two additional analog transmission gates (44) and (46) connect one lead of the capacitors (40) or (42) to ground, labelled "V" in FIG. 1, when their respective control inputs (49) or (51) are driven active.

The control input (49) of transmission gate (48) is driven by positive discriminator output signal (34) which also drives the control input (47) of transmission gate (46). Likewise, the control input (51) of transmission gate (50) is driven by negative discriminator output signal (36), as is the control input (45) of transmission gate (44). The complementarity of signals (34) and (36) assures that when capacitor (40) is connected to summing junction (56), the other capacitor (42) is connected to ground, and vice versa, thus insuring that the voltage across capacitor (42) will at all times be the same as that across capacitor (40). Thus, no instantaneous change will result at (58) when signals (34) and (36) reverse states, thus switching the summing junction (56) from capacitor (40) to capacitor (42) or vice versa.

Operation of Invention

In operation, a force in the appropriate direction applied to the joystick (10) resulting in an output signal (12) of sufficient magnitude to overcome the dead band of the amplifier (14) will result in a signal (16) of the appropriate polarity and magnitude. Regardless of polarity, the absolute value circuit (18) will present an output (20) which is positive in polarity and linearly related to the magnitude of signal (16).

Differentiator circuit (22) provides an output (24) which represents the time derivative of signal (20). If the magnitude of amplified joystick signal (16) is increasing, regardless of polarity, the output (24) will be positive. If the magnitude of the amplified joystick signal (16) is decreasing, signal (24) will be of negative polarity.

Output (24) is then tested by comparators (28) and (30). If signal (24) is more positive than the reference voltage V1, the output (29) of comparator (28) will be active, causing latch (32) to set. If signal (24) is more negative than reference voltage V2, output (31) of comparator (30) will be active, causing latch (32) to reset. In the set condition, output (34) will be active and output (36) will be inactive. In the reset condition, output (34) will be inactive and output (36) will be active. V1 will be set more positive than V2 in order to create a hysteresis response and thereby to avoid oscillation or spurious response to low-level noise superimposed on signal (24).

Operational amplifier (38) functions as a linear inverting amplifier of signal (16) with a "quickening" characteristic. The transfer equation of this amplifier may be expressed as:

$$V58 = -V16(R48/R50)(1 - EXP(t/(R54)(C)))  \quad \text{(equation 1)}$$

where R48 and R50 are the resistances in ohms of resistors (48) and (50) respectively, t is time in seconds, the expression EXP(x) represents raising the base of natural logarithms to the power x, and C is the value in farads of capacitor (40) or (42), depending upon the state of signals (34) and (36).

The resulting voltage (58) is applied to the cursor forming curcuit (60) which sends the appropriate signal (62) to the display (64) so as to generate movement of a cursor (66) on the display screen with a velocity corresponding to the magnitude and polarity of signal (58).

Cursor control voltage (58) may be of either polarity and the movement of cursor (66) will exhibit different acceleration and deceleration characteristics depending upon the values of capacitors (40) and (42) as acted upon by equation (1) above.

A stepwise displacement of joystick actuator (10) will thus result in a cursor velocity which, according to equation (1), ramps up toward the velocity value represented by the joystick displacement. The slope of the ramp will continually decrease with time so that the terminal velocity is approached asymptotically. A stepwise removal of input to joystick (10) will result in a similar asymptotic ramping down of cursor velocity, but with a different time behavior, since the exponent of equation (1) is changed by the substitution of capacitor (42) for capacitor (40) under control of signals (34) and (36) which respond to the decreasing nature of the signal produced by joystick (10). If the value of capacitor (42) is smaller than that of capacitor (40), the transient behavior of the cursor velocity will be more sluggish for a joystick (10) motion which commands increasing cursor velocity than for a joystick (10) motion which commands decreasing cursor velocity. This results in system performance which is more kinaesthetically pleasing to an operator than systems implemented using prior art.

Figure 2:
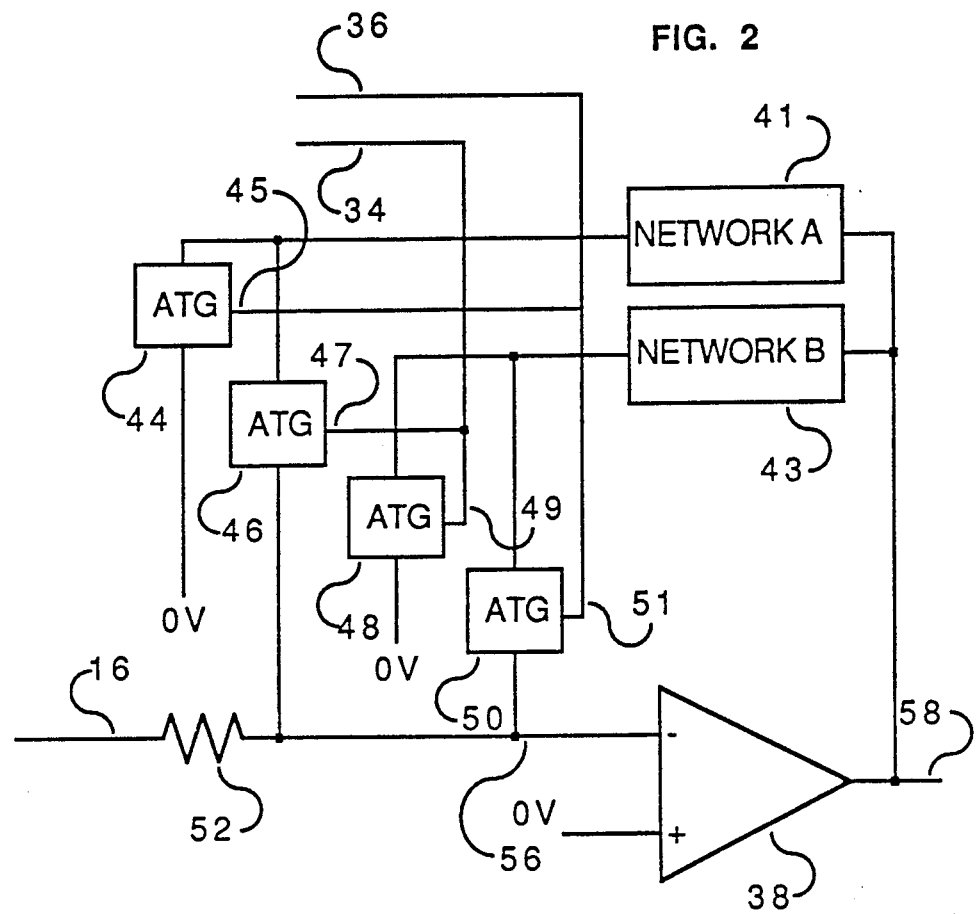
FIG. 2 shows a detail of a version of the circuit of FIG. 1 in which networks allow the realization of complex transfer functions.
Figure 3:
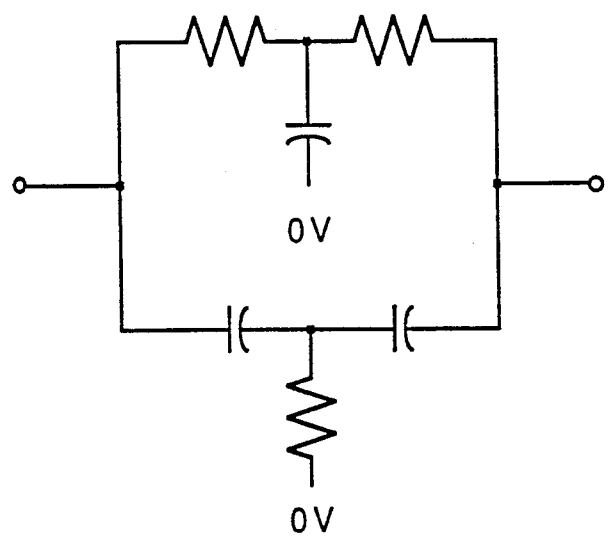
FIG. 3 shows an example of the "twin T" network suitable for use in the circuit of FIG. 1.

In FIG. 2 capacitors (40) and (42) in the operational amplifier circuit (38) are replaced by more complex networks (41) and (43) consisting of resistive and reactive elements. One example of such a network is the well-known "twin-T" configuration, shown in FIG. 3, through the use of which arbitrarily complex conjugate exponential transfer functions may be realized.

Figure 4:
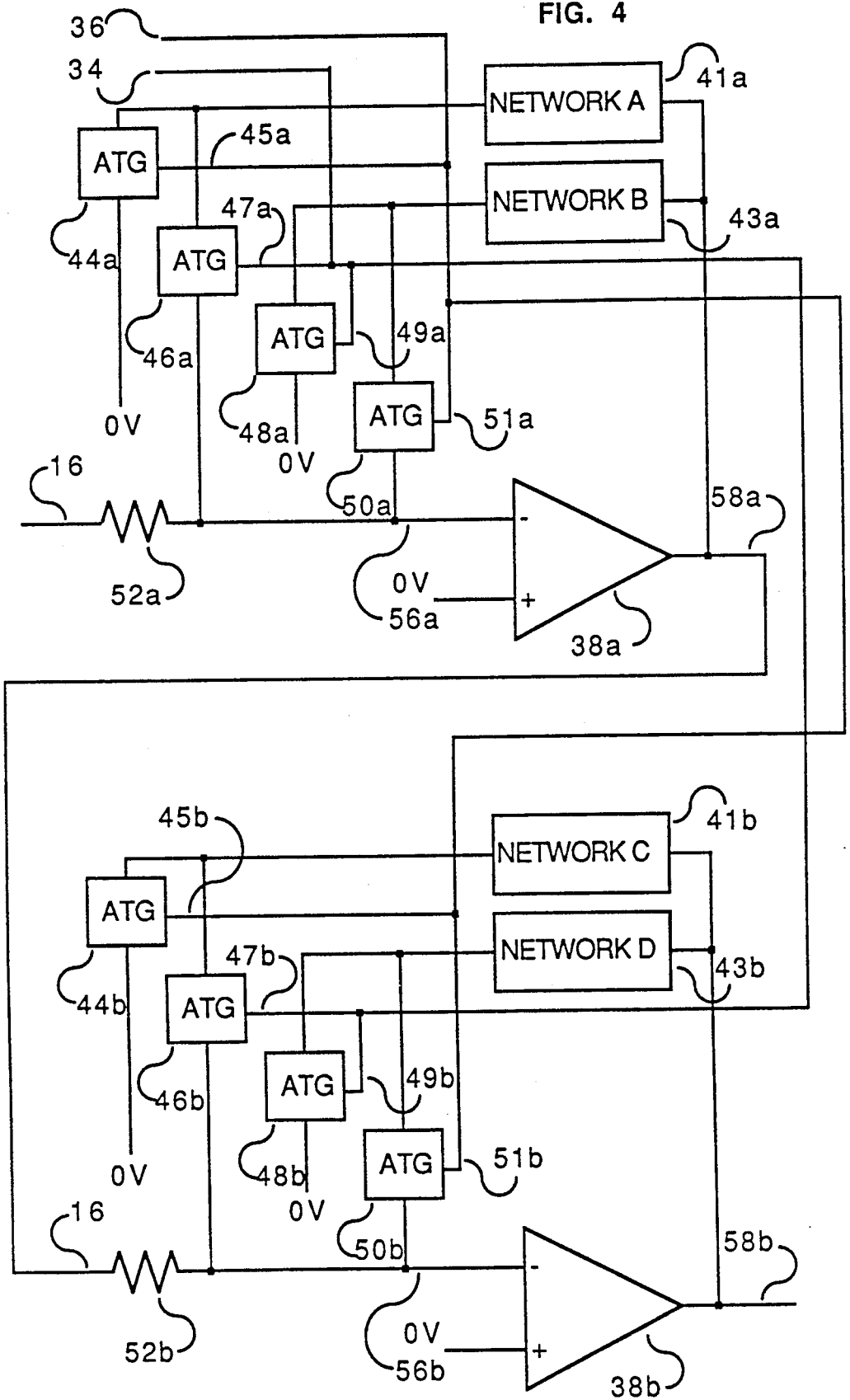
FIG. 4 shows a detail of a version of the circuit of FIG. 1 in which cascaded operational amplifiers are used to implement a transfer function which is a sum of complex terms.

In FIG. 4 multiple operational amplifiers are connected in cascade in order to implement a transfer function comprised of a number of summed exponential terms.

The functions of the system in FIG. 1 may also be performed by software executed by a microprocessor system as shown in FIG. 5. In this system isometric joystick (10) produces resolved x outputs (72) and y outputs (74) which are passed to analog-to-digital converter (76), which in turn communicates with the central processing unit (80) through data bus (78) under control of address bus (82). Random-access memory (84) and display adapter (86) are likewise connected to central processing unit (80) through data bus (78) and address bus (82). Timer (92) generates a regular interrupt signal (94) which causes the central processing unit (80) to execute joystick reading and processing program at regular intervals. The program is stored in the random access memory (84), which is also used for storage of intermediate variables and parameters. The display adapter (86) produces an output (62) which drives the display (64).

Software capable of performing the functionality of the circuit in FIG. 1 is shown as a flow diagram in FIG. 6 and FIG. 7. In these figures the following nomenclature is employed:

V is the input signal received from the joystick actuator

V0 is the cursor velocity

V1 is the positive detection threshold of the discriminator

V2 is the negative detection threshold of the discriminator

C is the center value output by the joystick actuator when at rest

D is the offset in either direction from the center value C which constitutes the dead band E is the offset between the value V received from the joystick actuator and the value C of the joystick actuator produced when at rest P is the joystick value V recorded during the previous sample F is the difference between the value currently received from the joystick actuator and the previously recorded value P SP is a flag variable which indicates speeding or slowing of the joystick input K is a parameter which scales the value received from the joystick actuator to asymptotic cursor velocity M is a parameter which determines the incremental slope of the quickening action Ksl is the value of K intended in the slowing condition Ksp is the value of K intended in the speeding condition Msl is the value of M intended in the slowing condition Msp is the value of M intended in the speeding condition G is the asymptotic value of cursor velocity H is the change in asymptotic cursor velocity J is the change in actual cursor velocity during the current sample.

The execution of the program is initiated upon receipt by the central processor (80) of a regularly-timed interrupt signal (94). The program shown will convert the value received from one channel of the joystick to a number representing the appropriate cursor velocity. The means of implementing the cursor through the display adapter (86) are well known prior art and are not claimed as a novel part of the invention.

Upon entry, the value V is read from one channel of the analog-to-digital converter (76) and the value E is computed by subtracting the at-rest value C. A test is then performed to determine whether E falls outside the dead-band parameter D in the positive or negative direction. If E is more positive than D, the first test results in a "yes" branch, and the value F is computed as the difference between the value V and that of P, the value of V recorded in the previous sample time.

If E is more negative than negative D, the second test results in a "yes" branch, and the value of F is likewise computed with compensation for the sign of V. Thus, a positive value for F implies an increase in absolute magnitude of the joystick value compared with the previous value. In this way the absolute value function of FIG. 1 is implemented.

If E does not lie outside the dead band, which is of width D centered about value C, both tests fail and the software exits after updating P to the current value of V.

The value F represents the time differential of the absolute value of V. If the sample rate generated by timer (92) is much faster than the rate of change of the signals from joystick (70), and if the sample rate is constant, value F will be a close approximation of the instantaneous time derivative of the absolute value of V.

F is then tested against V1. If F is greater than V1, the value from the joystick is judged to be increasing and the Sp flag is set to 1. If the magnitude of F in the negative direction is greater than V2, the value from the joystick is judged to be decreasing and the Sp flag is cleared to zero. If the magnitude of F is not sufficient to exceed V1 or V2 in the appropriate direction, the value of Sp is left at its previously set value. In all cases the value of P is updated to be equal to the value V.

The flow diagram continues in FIG. 7 as the Sp flag is tested to determine whether speeding or slowing parameters are to be applied to the calculation of cursor speed. Parameters K and M are loaded with the appropriate values (Ksl or Ksp, Msl or Msp) depending upon the state of the Sp flag. The action of this part of the software performs the function of the analog transmission gates (44), (46), (48), (50) in FIG. 1.

Using the selected values of K and M, the software then computes G by multiplying K and V. This determines the new forcing function of the quickening function. The software then subtracts the current cursor velocity V0 to generate H, the differential forcing function. H is then multiplied by M to yield the new differential cursor velocity. The result is added to the previous value of V0 to generate the new absolute cursor velocity, which replaces the previous value of V0 and which is output to the cursor-forming section. This calculation section of software performs the function of operation amplifier (38) in FIG. 1, since the transfer function realized by these steps represents a close approximation to the asymptotic exponential function realized by the operational amplifier circuit in FIG. 1.

It may be appreciated that other transfer functions representing sums of real exponentials and complex exponentials may be realized by the application of kwown digital signal processing software techniques in place of the calculation steps indicated in FIG. 7. Additional parameters and intermediate variables may be necessary to accomplish the realization of such arbitrarily complex transfer functions, but the general rule of selecting different parameters based upon the judgement of intended cursor behavior is not affected by the type of signal processing using these parameters.

Conclusion, Ramifications, and Scope of Invention

A reader familiar with the state of the art wil understand that this invention provides a new and highly flexible method of controlling the response of visual cursor indicia in response to the intention of the operator as expressed through a variety of possible input means, most particulary those which resemble the isometric joystick or other limited-movement actuators.

While the above description of the invention contains many specificities, these should not be construed as limitations on the scope of the invention, but rather as an exemplification of one preferred embodiment thereof. For example, the cursor indicia may be the field of view of a microscope stage moving under x-y control of the operator by means of a joystick actuator and signal processing circuit.

Another possible embodiment may be the development of video "control panels" which change configuration as appropriate to the process under control and in which actuation of elements on the displayed control panel is carried out under control of an operator using an x-y joystick or similar actuator.

One important application of this embodiment would be as part of electronic "speller board" devices for use by paraplegics and other persons having limited capability of limb movement. Such devices enable such persons to communicate through spelling or typing words and letters when they are incapable of vocal motor control.

There is no limitations to two dimensions inherent in the invention, and controllers of three, six and even more dimensions may be built using this invention.

Accordingly, the scope of the invention should be determined not by the embodiments illustrated, but by the appended claims and their legal equivalents.

What is claimed is:

1. A graphic cursor positioning device comprising:
    input means responsive to operator actuation to generate a first cursor movement signal,
    signal processing means acting upon said first cursor movement signal to produce a corresponding second cursro movement signal,
    display means capable of presenting a variably positioned cursor indicia display, cursor generating means connected to said display means so as to cause movement of said cursor indicia in correspondence to said second cursor movement signal, said signal processing means including means for providing differing time response characteristics of said cursor indicia movement in correspondence to an increase or decrease of said first cursor movement signal.

2. The graphic cursor positioning device of claim 1, wherein said input means includes a dead band amplifier for producing said first cursor movement signal.

3. The graphic cursor positioning device of claim 2, wherein said signal processing means includes absolute value circuit means for receiving said first cursor movement signal and generating an absolute value signal corresponding to said first cursor movement signal.

4. The graphic cursor positioning device of claim 3, wherein said signal processing means includes differentiator means for receiving said absolute value signal and generating a differentiated signal corresponding to said absolute value signal.

5. The graphic cursor positioning device of claim 4, wherein said signal processing means includes discriminator means for detecting a positive or negative value of said differentiated signal.

6. The graphic cursor positioning device of claim 5, wherein said signal processing means includes operational amplifier means connected to conduct said first cursor movement signal between said input means and said cursor generating means, said operational amplifier means including variable feedback loop means connected to said discriminator means, whereby the transfer function of said operational amplifier is changed in accordance with the positive or negative value of said differentiated signal.

7. The graphic cursor positioning device of claim 6, having said signal processing means connected in communication with an external device, said external device being capable of transmitting information to said signal processing means, said information corresponding to parameters acted upon by said signal processing means so as to determine said time response characteristics of said signal processing means.

8. The graphic cursor positioning device of claim 4, wherein said differentiator means differentiates said absolute value signal with respect to time.

* * * * *